United States Patent [19]

Olschafskie et al.

[11] Patent Number: 5,301,243
[45] Date of Patent: Apr. 5, 1994

[54] HAND-HELD CHARACTER-ORIENTED SCANNER WITH EXTERNAL VIEW AREA

[76] Inventors: Francis Olschafskie, 46 Atherton St., Boston, Mass. 02119; Allan Chasanoff, 117 E. 36th St., New York, N.Y. 10016

[21] Appl. No.: 901,004

[22] Filed: Jun. 19, 1992

Related U.S. Application Data

[63] Continuation-in-part of Ser. No. 632,144, Dec. 21, 1990, abandoned.

[51] Int. Cl.⁵ .......................... G06K 9/22; G06K 9/20; G06K 7/10; H04N 1/21
[52] U.S. Cl. ........................................ 382/59; 382/67; 358/473; 235/472; 235/461
[58] Field of Search .................... 382/59, 1, 58, 60, 65, 382/67, 68; 358/473, 474, 478; 235/472, 454, 460, 463, 385, 461; H04N 1/21, 1/23

[56] References Cited

U.S. PATENT DOCUMENTS

| | | | |
|---|---|---|---|
| 3,541,248 | 11/1970 | Young | 358/473 |
| 3,918,028 | 11/1975 | Humphrey et al. | 382/59 |
| 3,947,817 | 3/1976 | Requa et al. | 382/59 |
| 4,048,617 | 9/1977 | Neff | 340/146.3 |
| 4,158,194 | 6/1979 | McWaters et al. | 382/59 |
| 4,180,204 | 12/1979 | Koenig et al. | 235/385 |
| 4,475,240 | 10/1984 | Brogardh et al. | 382/59 |
| 4,800,444 | 1/1989 | Suzuki et al. | 358/294 |
| 4,817,185 | 3/1989 | Yamaguchi et al. | 382/59 |
| 4,818,856 | 4/1989 | Matsushima et al. | 235/472 |
| 4,887,165 | 12/1989 | Sato et al. | 358/474 |
| 4,947,261 | 8/1990 | Ishikawa et al. | 358/473 |
| 5,012,349 | 4/1991 | de Fay | 358/296 |
| 5,063,508 | 11/1991 | Yamada et al. | 364/419 |
| 5,083,218 | 1/1992 | Takasu et al. | 358/473 |
| 5,121,226 | 6/1992 | Kubota et al. | 358/473 |

OTHER PUBLICATIONS

Badgett et al, "Buyer's Guide Scanners under $1,000", Computer Shopper, Jul. 1990.
Peterson, "From Fax to Finish Scanners Build a Better Image", PC Magazine Mar. 28, 1989.

*Primary Examiner*—David K. Moore
*Assistant Examiner*—Michael R. Cammarata
*Attorney, Agent, or Firm*—Bromberg & Sunstein

[57] ABSTRACT

A hand-held scanner is provided for reading characters from a string of characters recorded on a substrate. The scanner may be held like a pen and moved, in contact with the substrate, along the string of characters. Movement of the scanner is sensed by a sensor. An optical system views a small area of the substrate and an optical detector detects the relative intensity of light reflected from each of several points in the area of view. To facilitate tracking, a portion of the string of characters adjacent to the area of view is clearly visible to the user. The scanner includes memory for storing codes representing individual characters. The scanner may include a computer, connected by a cable, or may be self-contained and battery operated.

20 Claims, 18 Drawing Sheets

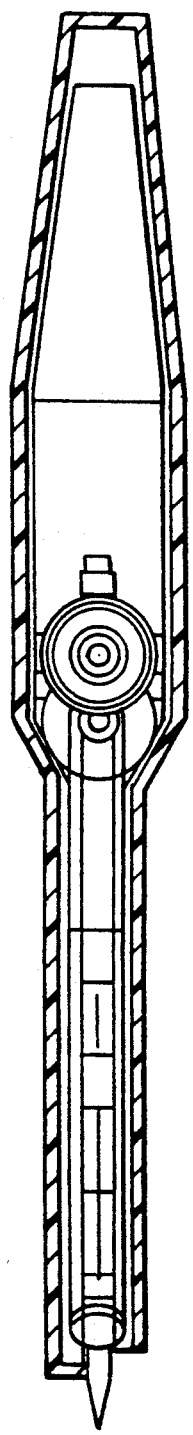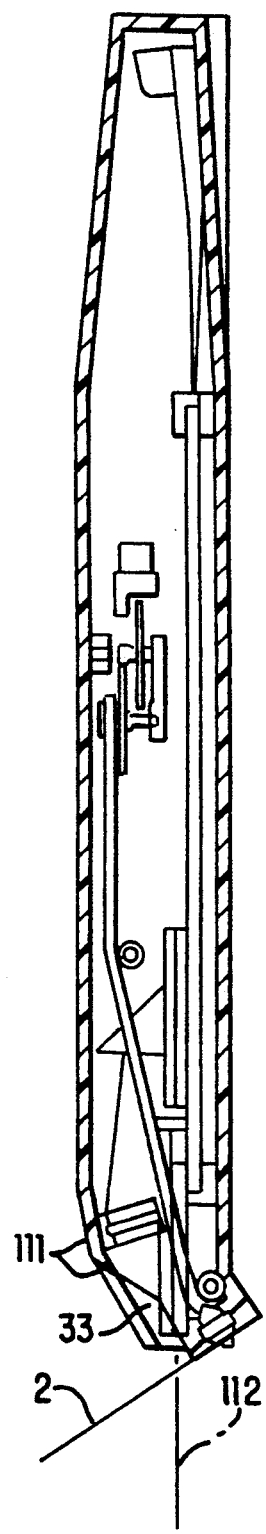
FIG. 13
FIG. 14

HAND-HELD CHARACTER-ORIENTED SCANNER WITH EXTERNAL VIEW AREA

This application is a continuation-in-part of application Ser. No. 632,144, filed Dec. 21, 1990 now abandoned.

TECHNICAL FIELD OF THE INVENTION

The invention relates generally to hand-held scanners and more specifically to hand-held scanners for scanning text.

BACKGROUND OF THE INVENTION

Hand-held scanners used for acquiring textual information from printed sources are available but all of them are bulky, most require to be connected via cable to a computer while in use and none are capable of reading along a line of text, one character at a time, to selectively read a single line of text or a portion of a single line of text.

U.S. Pat. No. 4,887,165 to Sato discloses a portable image reader, having a detachable memory, capable of scanning a document and selectively storing bit-mapped images in its detachable memory for later transfer to a computer for OCR processing and editing. The image reader of the Sato invention is designed to operate disconnected from the body of the document editing apparatus. It is moved by hand down a document such that its viewing area covers each entire line of text in succession. There is provision for selective discard of scanned images (such as portions of a page read from the document for test purposes or portions of a page that are deemed unnecessary) to improve utilization of the limited memory available. However, the device is not capable of selectively reading individual characters from a line.

U.S. Pat. No. 4,158,194 to McWaters discloses a battery-operated hand-held optical character reader, including a hand-held wand and a recognition control unit, that is capable of manual scanning of alphanumeric characters. The wand includes a keyboard and a display and is designed to be moved along a line of text such as on a label or on a document. The wand provides illumination of the label or document by use of a fiber-optic light pipe. The wand is, however, attached by a cable (or by a receive/transmit unit) to the recognition control unit which is battery operated and portable but too large to be hand-held.

U.S. Pat. No. 4,817,185 to Yamoguchi discloses an optical character reader having a hand-held scanner whose field of view covers a plurality of characters such as for reading the characters on a price tag. This scanner provides character line deletion and selects from among horizontal optical recognition ranges of various widths corresponding to possible character heights.

U.S. Pat. No. 3,947,817 to Requa discloses a hand-held optical data reader and a processor utilizing a two dimensional array of photosensitive elements capable of operation at a high frame rate. The processor is an OCR device using hardware combinational logic. The optical data reader is connected by a cable to the processor. The invention includes timing circuitry to overcome the inaccuracies arising from the loosely constrained movement of a hand-held device.

U.S. Pat. No. 3,918,028 to Humphrey discloses a hand-held optical reader having a light source and a line-array of optical sensors and the hand-held optical reader contains OCR circuitry. The OCR circuitry is capable of recognizing a limited set of characters consisting of horizontal and vertical bars.

U.S Pat. No. 4,048,617 to Neff discloses apparatus and method for detecting and discarding characters picked up on the back scan when using a hand-held optical scan unit.

U.S. Pat. No. 4,180,204 to Koenig discloses a hand-held scanner for scanning and recognizing characters on shipping labels and for marking the label on successful completion of a character recognition reading using a photosensitive dye-forming material and a UV flash.

The article "Scanners Build a Better Image", *PC Magazine*, Mar. 28, 1989, describes the Mitsubishi Hand-Held Image Scanner. This hand-held scanner requires cable connection to a PC and with an optional attachment is capable of reading a full 8½ by 14 inch document. This device is not designed to scan selectively along a succession of single lines of text.

It is difficult for a user of a prior art scanner to aim the scanner and sweep the line of characters accurately because, with prior art scanners, it is impossible to view simultaneously characters before the device, directly under the device, and following the device. Accuracy of aim is critical, and the human hand is subject to variable movements that would jeopardize accurate movement.

SUMMARY OF THE INVENTION

A hand-held scanner is provided for reading characters from a string of characters recorded on a substrate. The housing of the scanner is shaped so that it may be held like a pen and conveniently moved, in contact with the substrate, along the string of characters. Movement of the scanner across the surface of the substrate is sensed by a sensor. An optical system, located within the housing, views a small area of the substrate and an optical detector detects the relative intensity of light reflected from each of several points in the area of view.

In a preferred embodiment, the area of view is clearly visible to the user while the scanner is being used for scanning. Also clearly visible, so as to facilitate tracking, is at least a portion of the string of characters adjacent to the area of view. The height of the area of view is not substantially greater than the maximum height of a character. The scanner includes memory for storing codes representing individual characters. In one embodiment the scanner includes a computer, connected to the housing via a cable. In a further embodiment the scanner is self-contained and battery operated.

BRIEF DESCRIPTION OF THE DRAWINGS

FIG. 2c shows the geometry of the optical system of the embodiment of FIG. 2a.

FIG. 9b shows a view of the movement sensor along direction A—A of FIG. 9a.

FIG. 13 is a partially cut-away plan view of the embodiment of FIG. 11.

FIG. 14 is a partially cut-away elevation view of the embodiment of FIG. 11.

DETAILED DESCRIPTION OF THE INVENTION

The invention provides a small, battery-operated, hand-held, pen-like scanner for note-taking, i.e., acquiring textual information from printed sources. The scanner is capable of reading and storing selected information, for example, some or all of the characters from a given line of text. The text is stored in a series of digital data records, each record containing a representation of a single character in bit-mapped form. The scanner has a contact scanning head having an area of view sized for compatibility with printed characters having point size 9pt, 10pt or 11pt which are commonly-used print standards. The scanner is stroked along a line of text, in one embodiment from left to right, so that each character in turn is partially in the view area. In this way the area of view encompasses a succession of substantially vertical slices of each character. A character boundary is recognized when the view area of the scanner is filled by white space. A digital bit-map representation of a given character is stored in the memory of the scanner along with appropriate delimiters. In this way a series of records are stored corresponding to the sequence of characters along the line of text. The scanner also recognizes and stores the spaces between words and an indication of "end of line" (or carriage return). In a first embodiment a connector is provided in the scanner so that records ("frame units" of bit-mapped data) may be uploaded into a computer having OCR software capable of transforming the records into an ASCII text file.

Figure 1:
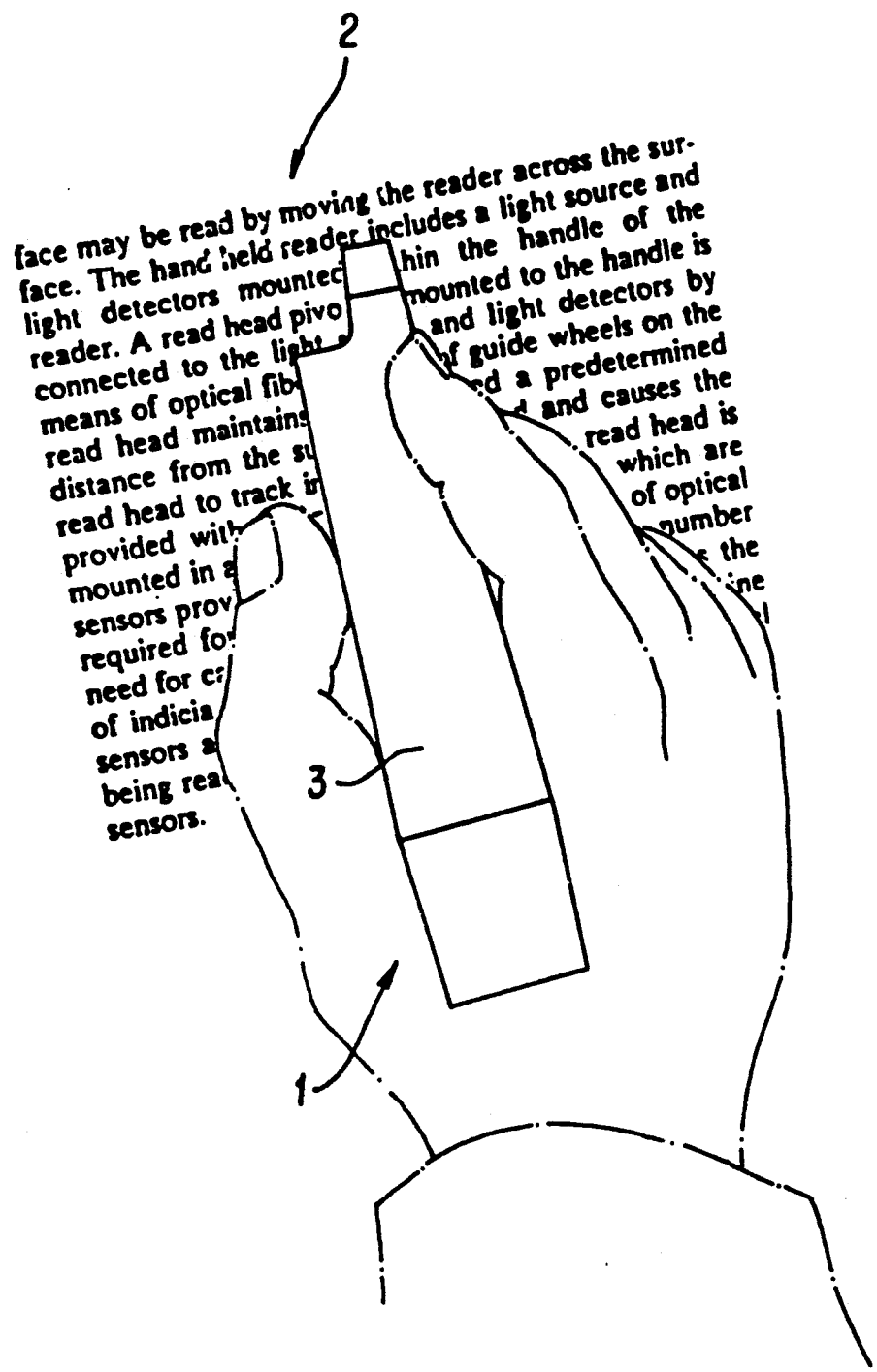
FIG. 1 is a general view of a first embodiment of a hand-held scanner according to the present invention.
Figure 2A:
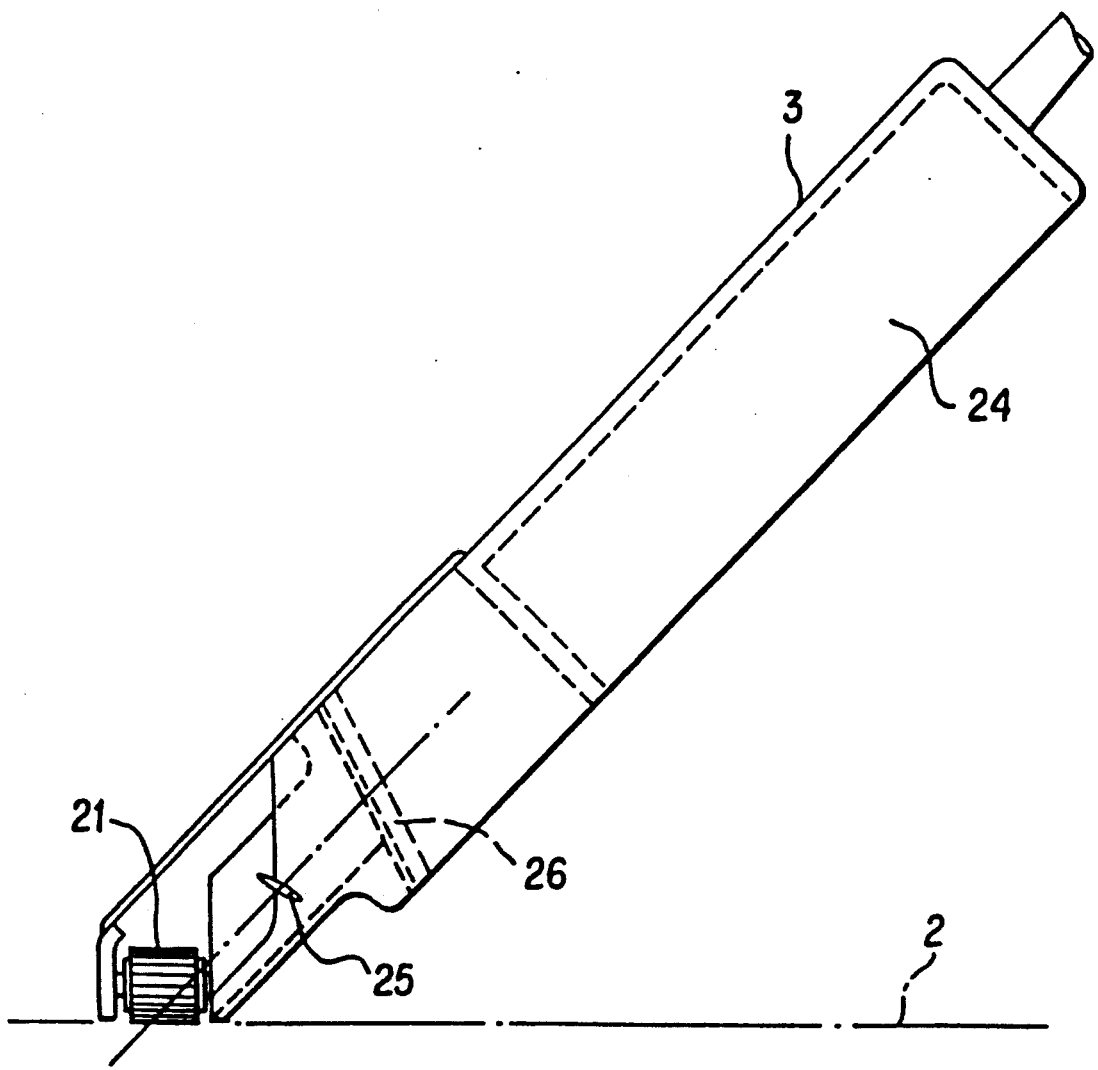
FIG. 2a is a partially cut-away elevation view of a second embodiment of a hand-held scanner according to the present invention, showing the major systems.
Figure 2B:
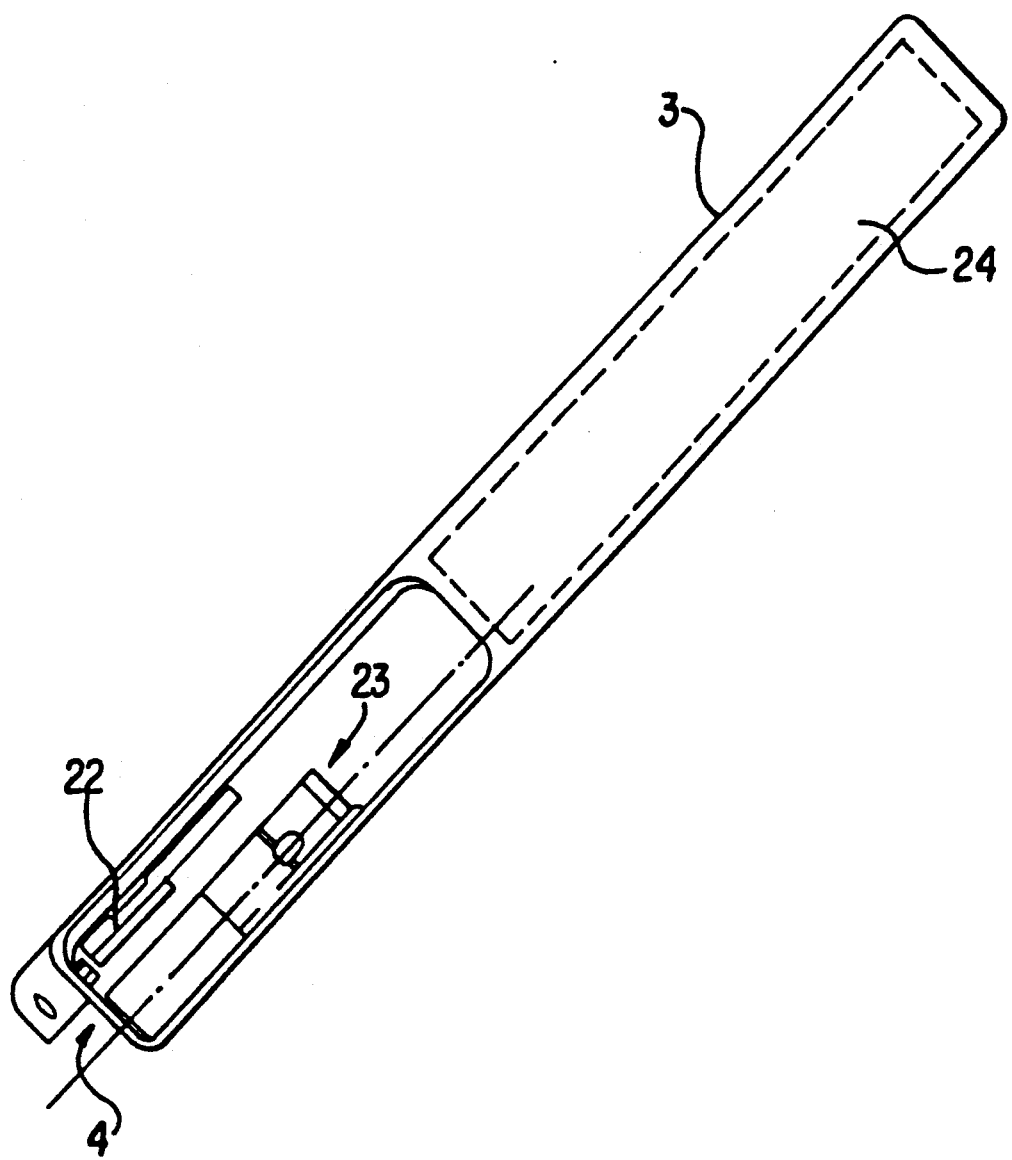
FIG. 2b is a partially cut-away plan view of the scanner of FIG. 1, showing the same major systems.
Figure 3A:
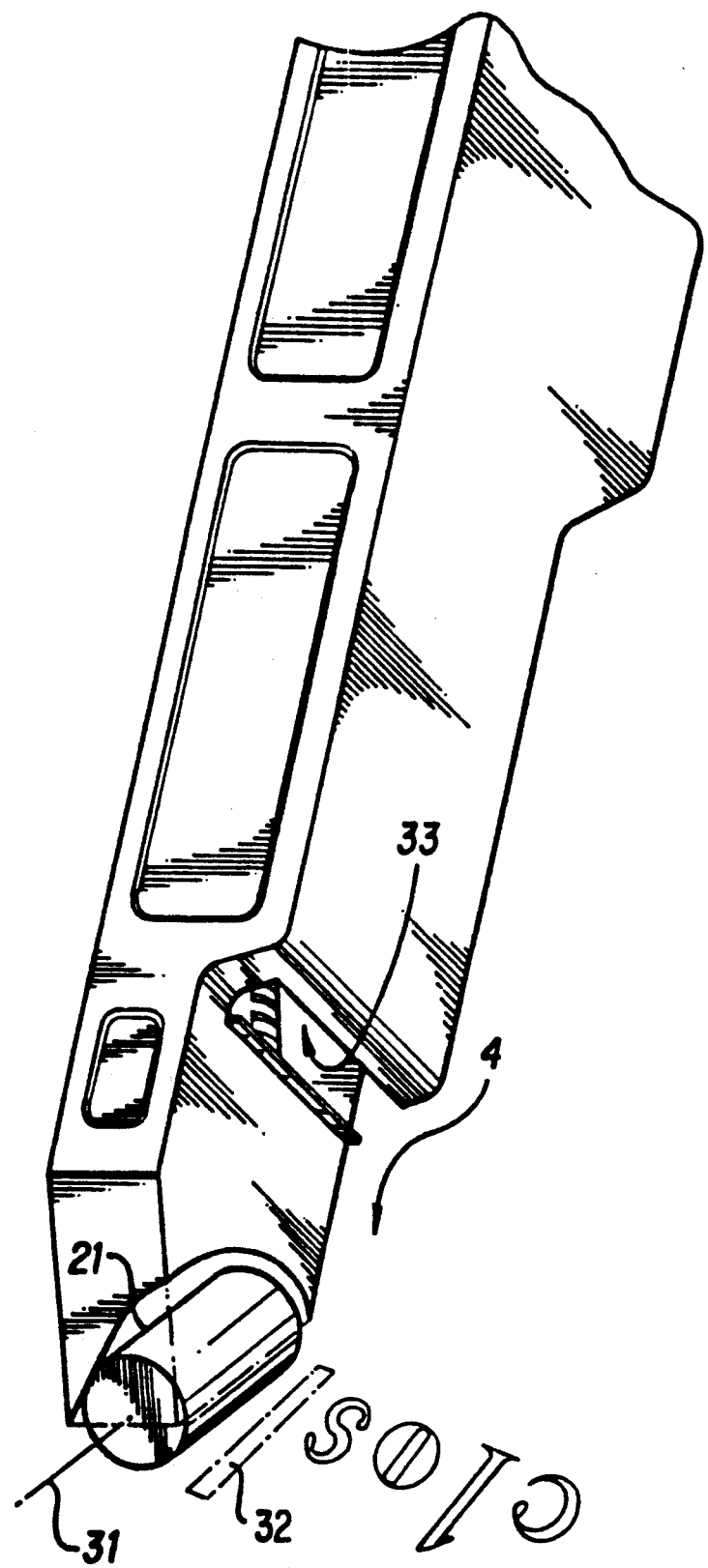
FIG. 3a is a partially cut-away perspective view of the tip of an embodiment of the scanner of FIG. 1.
Figure 4A:
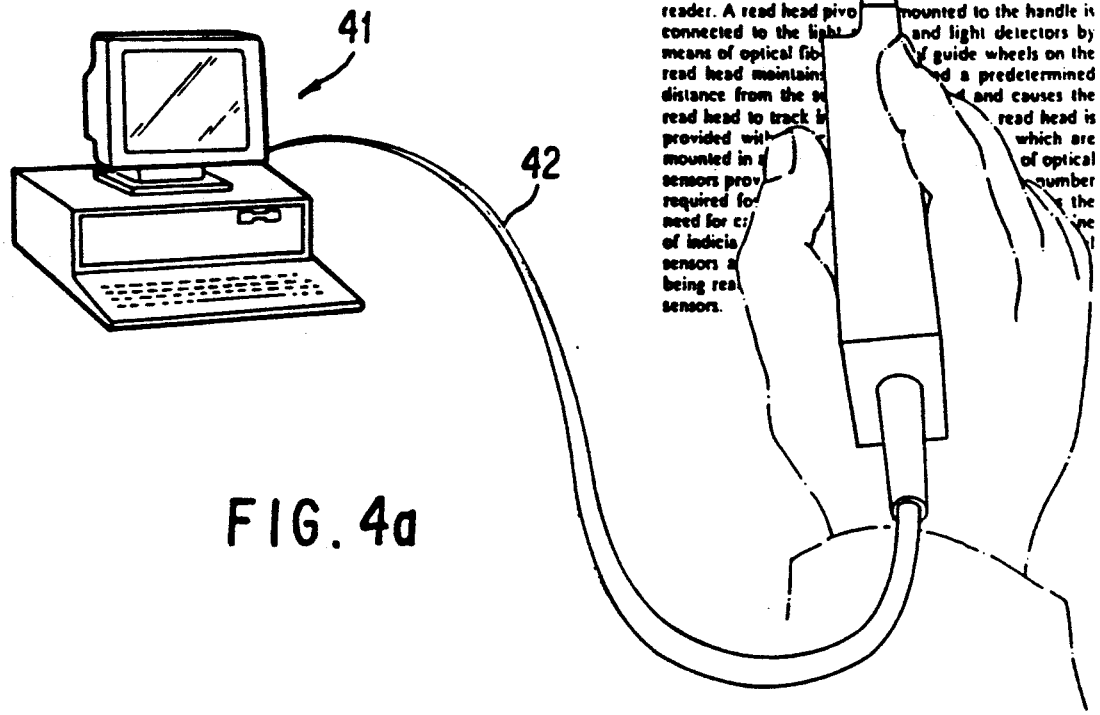
FIG. 4a shows an embodiment wherein the electronic processor is a personal computer.

A first embodiment of the scanner of the present invention is shown in FIG. 1. The entire scanner 1, in this embodiment is battery operated and self-contained. It is shown, held in the hand of the user, scanning a document 2. A second embodiment includes a computer external to the housing, and is shown in FIG. 4a. A partially cut-away elevation and plan view of the second embodiment are shown in FIGS. 2a and 2b respectively. FIG. 2a shows a wheel 21, sometimes referred to as a "roller", in contact with the substrate 2. The general location of the movement sensor 22, the optical system 23 and the detector electronics board 24 are shown in these drawings. FIG. 2a shows the lens 25 and the diode array detector 26. The image of the substrate in the area of view, which is shown in FIG. 3a, 32 is focussed by the lens onto the diode array detector. In this embodiment the diode array detector comprises 64 individual diodes. FIG. 2b shows the cut-away area of the housing 4 which permits the user to see the characters about to enter the area of view of scanner. To further facilitate tracking, a visual alignment guide may be provided. An index line or a pair of index lines on top of (or on the side of) the housing may be provided. Alternatively, an alignment protrusion or bar may be provided.

Figure 3B:
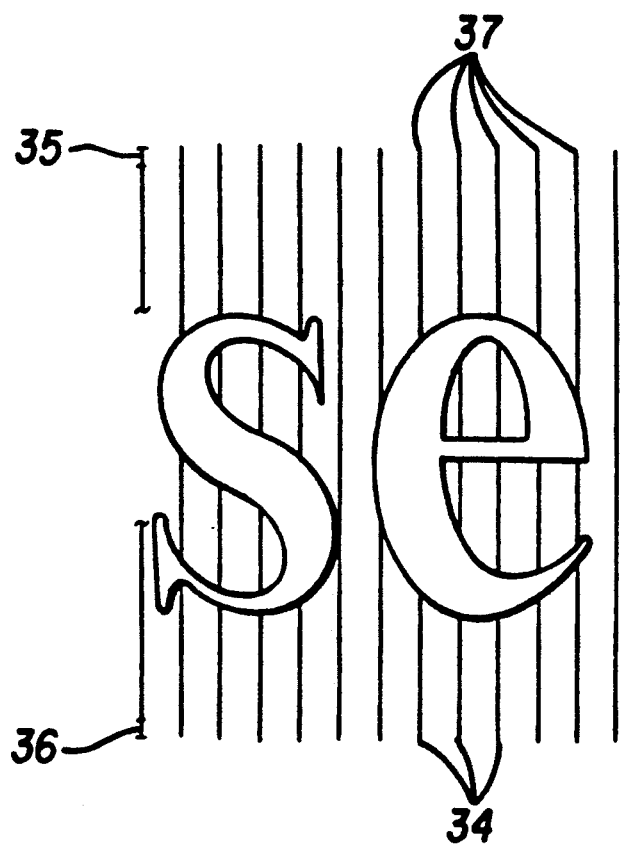
FIG. 3b shows a series of intersection lines along the string of characters.

FIG. 3a shows a partially cut-away perspective view of the tip of the scanner, or scanner head, showing the wheel 21 in contact with the document, the elongated area of view 32, or strip and the cut-away region of the housing 4. The optical system (23 in FIG. 2a), includes the lens and the diode array detector. FIG. 3a shows a sensing window 33 through which the optical system views an elongated area of view 32. The length of the long axis of the elongated area of view 32 is 5.40 mm–5.70 mm. FIG. 3b shows a series of intersection lines 34 along the string of characters corresponding to successive scan positions as the scanner is moved over the substrate along the line of characters. Each intersection line, corresponding to a single position of the area view 32, is viewed by a diode array detector. The diode array detector in the second embodiment includes an array of 128 diodes. Half of the diodes (64 diodes, every second diode) are used. Thus, viewing a single intersection line yields 64 pixels. The first pixel and the 64th pixel are shown in FIG. 3b as items 35 and 36 respectively. An "end-of-character" is recognized when the diode array sees only white space. Data from the intersection lines between two consecutive "white space" lines defines a single character. Each intersection line provides 64 bits of data. One character therefore is represented by n * 64 bits of data where n is the number of intersection lines the character contains. In the example shown in FIG. 3b, the letter "e" is encoded by the five intersection lines 37 yielding 5 * 64=320 bits of data.

Figure 4B:
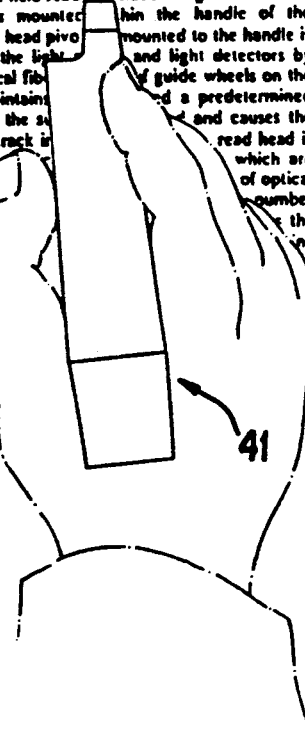
FIG. 4b shows a self-contained embodiment wherein the electronic processor is mounted within the housing.

FIGS. 4a and 4b show the location of the electronic processor function 41 referred to hereinbelow. In FIG. 4a, which shows the second embodiment, the processor function resides in a personal computer. FIG. 4b, which shows he first embodiment, the processor function is included in a microprocessor mounted within the housing. The scanner of both embodiments inserts a single, soft carriage return each time the wheel loses contact with the document. FIG. 4a shows, on the screen of the PC display, a typical display resulting from scanning a series of short lines of text. The embodiment of FIG. 4b, the self-contained scanner, also includes a connector (not shown) so that after a document has been scanned, data stored in the scanner memory may be transferred via a cable to a computer. Of course, other methods of transferring data could be used, within the scope of the invention, such as infra red transmission or a removable memory.

Figure 5:
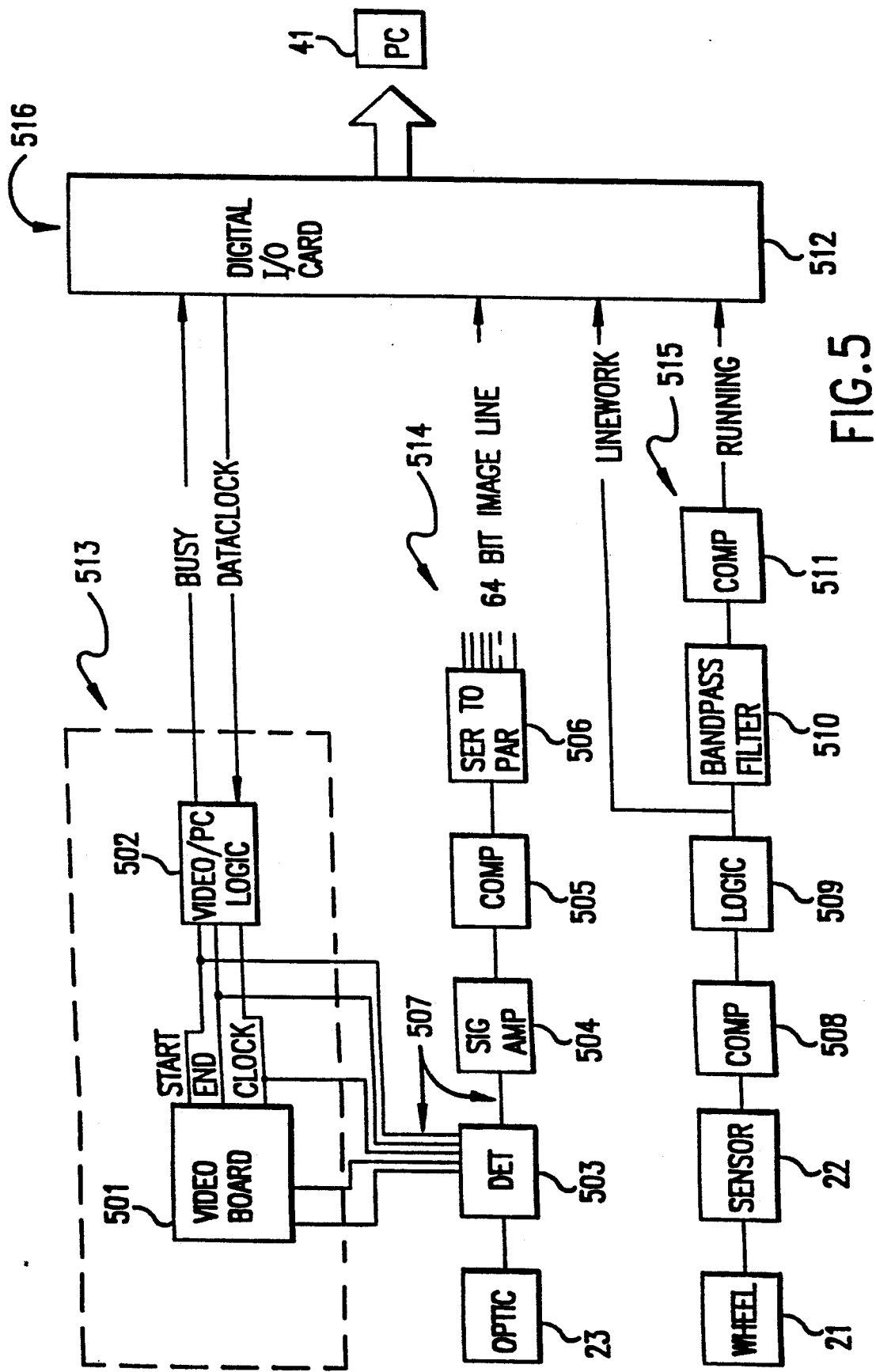
FIG. 5 is a functional block diagram of the scanner.

FIG. 5 shows all three major functional elements of a preferred embodiment of a scanner corresponding to FIG. 4a. The three major elements are the light intensity measurement system 514, the movement detection system 515 and the control and synchronization system 516. The light intensity measurement system includes the optical system 23, the detector board 503 including the diode array detector 26, the signal amplifier 504, the output (TTL) comparator 505, and the serial to parallel converter 506. The movement detection system includes the wheel 21, the movement sensor 22, wheel sensor comparator 1 508, wheel sensor logic 509, bandpass filter 510 and wheel sensor comparator 2 511. The control and synchronization system includes the digital I/O card 512, an off-the-shelf board mounted within the PC, the PC itself and the software that runs the PC. Each of these three systems will now be discussed in turn.

LIGHT INTENSITY MEASUREMENT SYSTEM

Figure 2C:
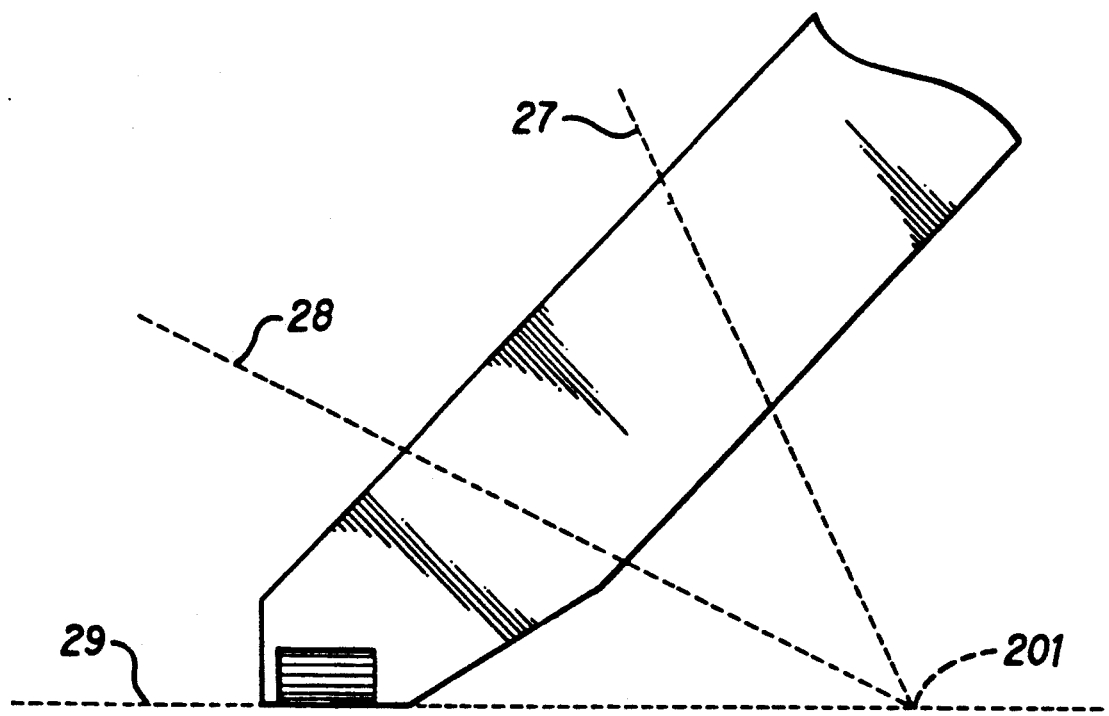

The optical system for a preferred embodiment is shown in FIGS. 2a, 2b and 2c. It includes a symmetric biconvex lens 25, 9 mm focal length, 6 mm diameter, positioned in the Schiempflugg condition between the object and the image. Referring to FIG. 2c, in this condition, the object plane 29, the image plane 27 and the plane of the lens 28 meet in a line 201 and all points on the object plane are in focus on the image plane. The angles have been chosen so that total internal reflection within the detector window cannot occur. Unity optical magnification is used. At this magnification the simple symmetric lens yields relatively good image quality. The operating f number is 4 or higher.

In a preferred embodiment, the optical system includes a SELFOC lens system. This approach provides a lower cost lens system. The use of a SELFOC lens system also minimizes assembly cost because such systems are "self-aligning".

The detector board 503 includes an EG&G/Reticon CCD array. For an embodiment corresponding to FIG. 4a, the detector board also includes line receivers and line driver buffers to interface to the cable. The CCD array detects light, and transmits its signal via the detector/video board cable 507 to the signal amplifier 504.

In the embodiment of FIG. 4a, the detector 503 is an EG&G T series CCD array with 128 pixels covering 0.25 inch (6.35 cm). In a preferred embodiment, every other pixel is sampled, yielding 64 pixels/line or 256 pixels/inch (101 pixels/cm). The video board electronics 501 has a "boxcar" style output. The output is fed into a comparator 505 and a serial to parallel converter 506. A field stop is used to limit the image projected onto the detector.

The signal amplifier 504 is located on the video board 501, within the housing, to ensure good electronic transmission. A level shifting circuit whose output is fed to the comparator 505 is also mounted on the video board.

The video board 501 provides the proper voltages and control signals for the detector board 503, generates clock phases, and amplifies and translates the CCD output signal. The output of the video board consists of three control signals, namely, a pixel clock, a start-of-frame signal, and an end-of-frame signal, and one analog signal which is the sampled and held CCD output bit. After a start-of-frame (and before the end-of-frame), the analog output is sampled on the rising edge of the pixel clock to ensure accurate data.

The output (TTL) comparator 505 is used to convert each sampled-and-held analog signal from the video board into a binary indication of light. The comparator has an adjustable threshold. The output of the comparator is a TTL compatible serial data stream, a stream of 64 bits out of the CCD array. These 64 bits contain the data from the viewing of a single intersection line.

Eight serial-in/parallel-out shift registers are used to capture this data stream. The serial bits are clocked with a gated pixel clock which is only active between a start-of-frame and an end-of-frame, and corresponds to one clock every other pixel. The parallel output of the serial-to-parallel convertor is used as the digital data for the software.

MOVEMENT DETECTION SYSTEM

The wheel 21 is preferably made of steel, has a straight knurled circumference and is rotatably mounted on a close fitting metal axle pressed into the housing. In one embodiment an electromagnetic wheel sensor is used. Alternatively, an optical wheel sensor may be used.

An electromagnetic wheel sensor has the advantage that it generates its own signal. However, the amplitude of signals so generated is a function of speed and at low speeds the amplitude is small. A preferred alternative is a fiber optic reflective-type wheel sensor which senses reflections from a polished camber on the knurl. Optical speed sensors operate down to very low speeds, but require a reliable source of light. The same source of light may be used to provide illumination for both the substrate and the wheel sensor.

The wheel sensor output is used to synchronize scanning at correct positions along the character string. The output of the wheel sensor is used to initiate scans at intersection lines 34 along the character stream as shown in FIG. 3b. When the scanner is moved across the surface of the substrate so that the wheel rotates and the wheel sensor detects the rotation, then comparator 508 and logic 509 generate a square wave. A differential amplifier, not shown but located between items 22 and 508 in FIG. 5, amplifies the wheel sensor's output to generate a signal large enough to drive wheel sensor comparator 1 508. Wheel sensor comparator 1 uses hysteresis to detect pulses from the wheel sensor, translates these pulses into fixed amplitude pulses and toggles a flip flop to provide a 50% duty cycle signal, or square wave. A change of state of this square wave indicates a displacement of the scanner across the substrate of 1/30th of an inch (0.0847 cm). The square wave is further filtered by a band-pass filter 510 (high-pass filtered, rectified then low-pass filtered) to yield a signal that is fed into wheel sensor comparator 2 511 to detect motion and generate a RUNNING signal. As shown in FIG. 5, this process yields LINE MARK triggers and a RUNNING signal. These signals are fed via the digital I/O board 512 into the PC 41 and are used by the PC software to generate DATA CLOCK signals which control the timing of scanning via video board 501 to correspond to the intersection lines 34 of FIG. 3b.

Figure 7A:
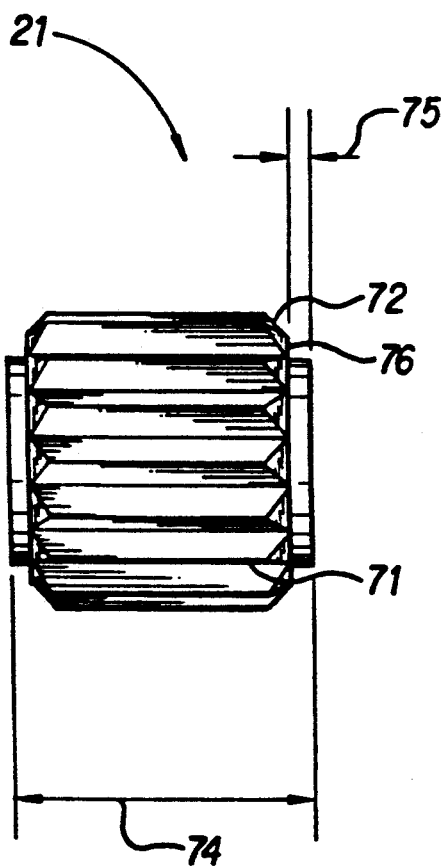
FIG. 7 shows the knurled wheel of the embodiment of FIG. 1.
Figure 7B:
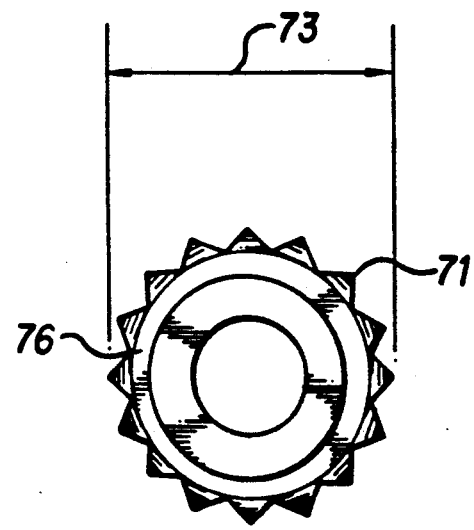

FIG. 7 shows the wheel construction having straight knurls 71 and a camber 72. In a preferred embodiment the wheel has a diameter 73 of 0.250 inch (6.35 cm) over the points of the knurls and a width 74 of 0.312 inch (7.92 cm). The camber 72 has a cutback 75 of 0.015 inch (0.381 cm) and a face width 76 of 0.050 inch (1.27 cm). It is cut at a 45° angle and the face is buffed bright. The knurls may be 0.012 inch (0.30 cm) deep (medium) or 0.005 inch (0.13 cm) deep (fine).

CONTROL, DISPLAY AND SYNCHRONIZATION SYSTEM

Figure 6A:
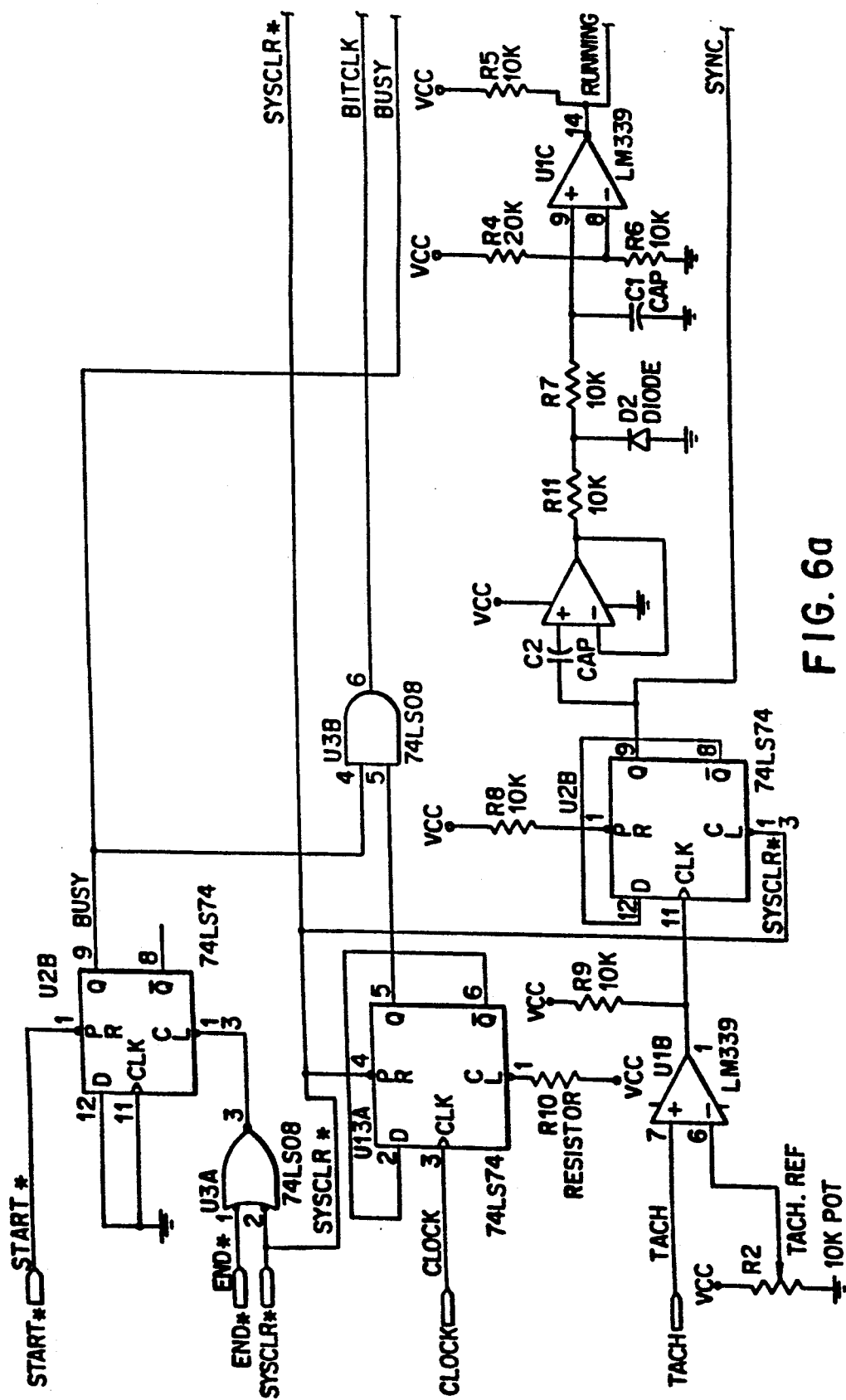
FIGS. 6a, 6b and 6c show the circuit diagram of the digital I/O board.
Figure 6B:
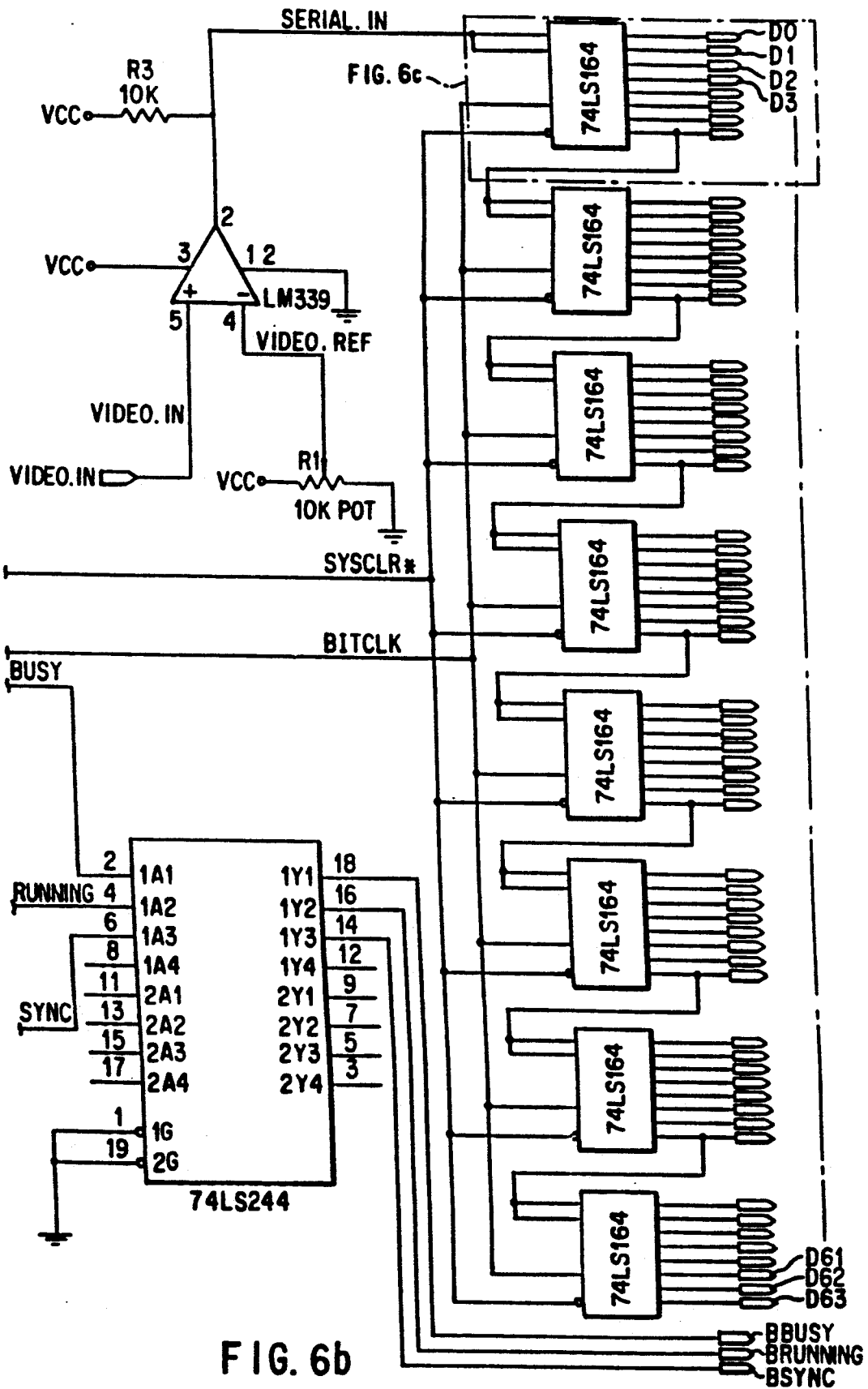
Figure 6C:
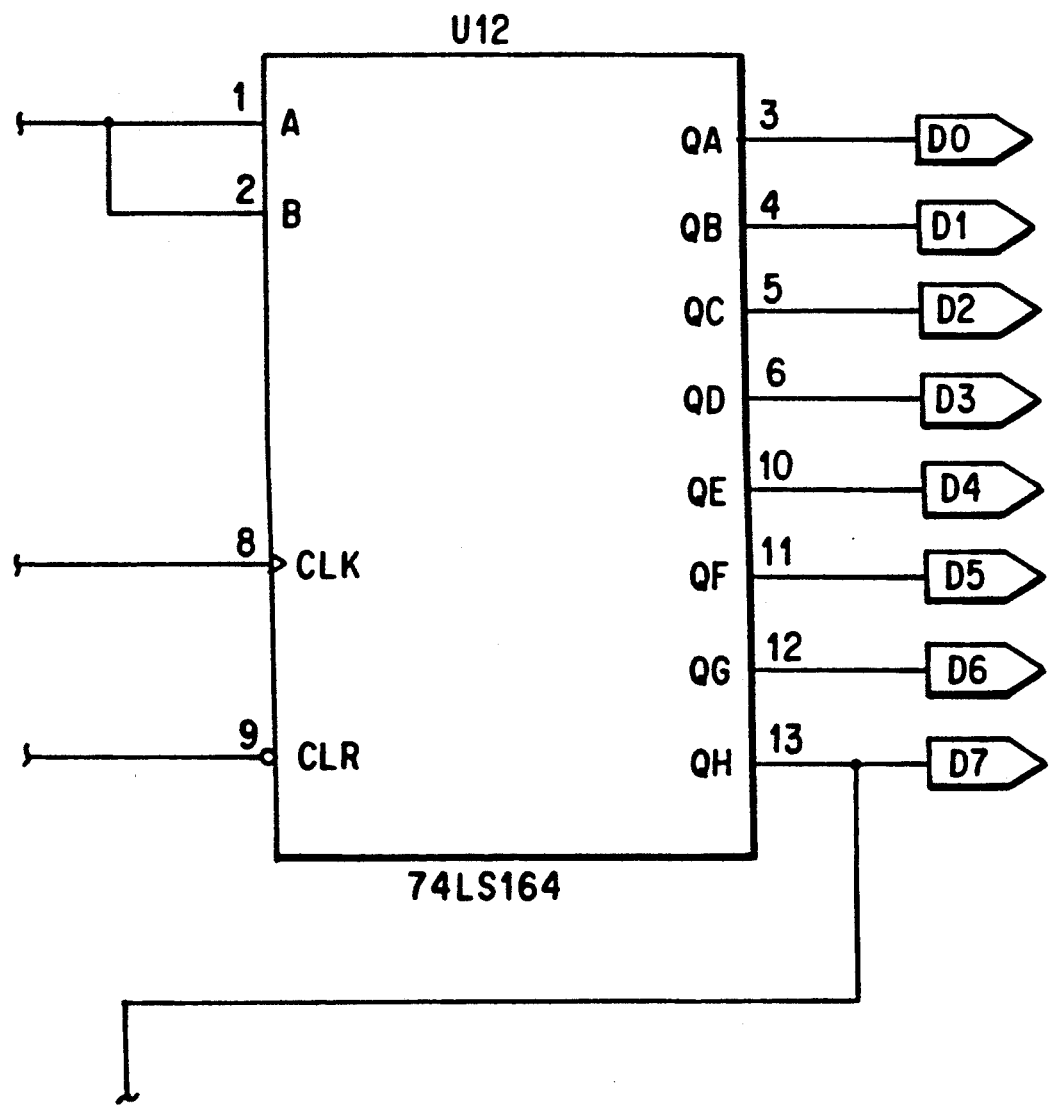

In the embodiment of FIG. 4a, an off-the-shelf digital I/O board 512, located within the PC, is used to accept the digital data from the movement sensor and from the optical system. The circuitry for this I/O board is shown in FIGS. 6a, 6b and 6c. Software in the PC detects motion by monitoring the RUNNING signal.

When the RUNNING signal is active, the pen is moving and scans are initiated. Software in the PC monitors the BUSY signal from the video/PC logic board 502 to determine when to upload the contents of the image buffers in the serial to parallel convertor 506. When the BUSY bit becomes inactive, the software uploads the data. This data includes the binary image, as well as the speed sensor SYNCH signal. Typically, data will be read at a rate faster than 300 frames per inch (118 frames per cm), although the SYNCH signal will only signal 1/30th of an inch (0.0847 cm).

When memory is full, or when pen motion is no longer detected, software in the PC processes the raw data. For every change in the SYNCH signal (representing 1/30th of an inch or 0.0847 cm), the software compresses the data such that there are ten frames worth of data for each SYNCH transition (1/300th of an inch or 0.00847 cm). This off-line processing yields the required resolution of 1/300th inch (0.00847 cm), without requiring a speed sensor with so fine a grain.

Once the raw data has been compressed, and perhaps displayed, the software can perform additional data compression for storage to disk.

EMBODIMENT WITH ILLUMINATION SYSTEM

Figure 8:
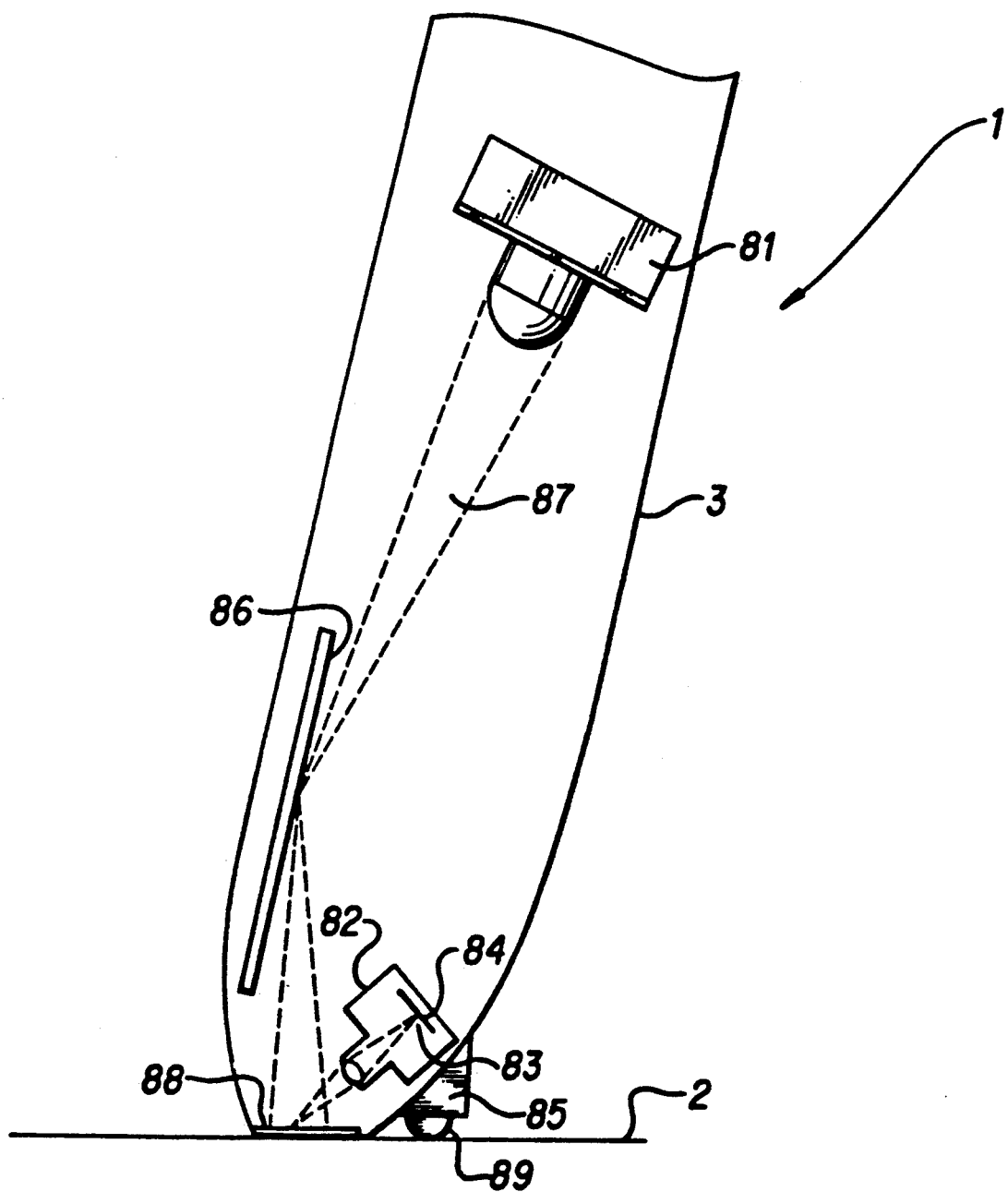
FIG. 8 is a partially cut-away view of a third embodiment of the scanner, having an illumination system.
Figure 9A:
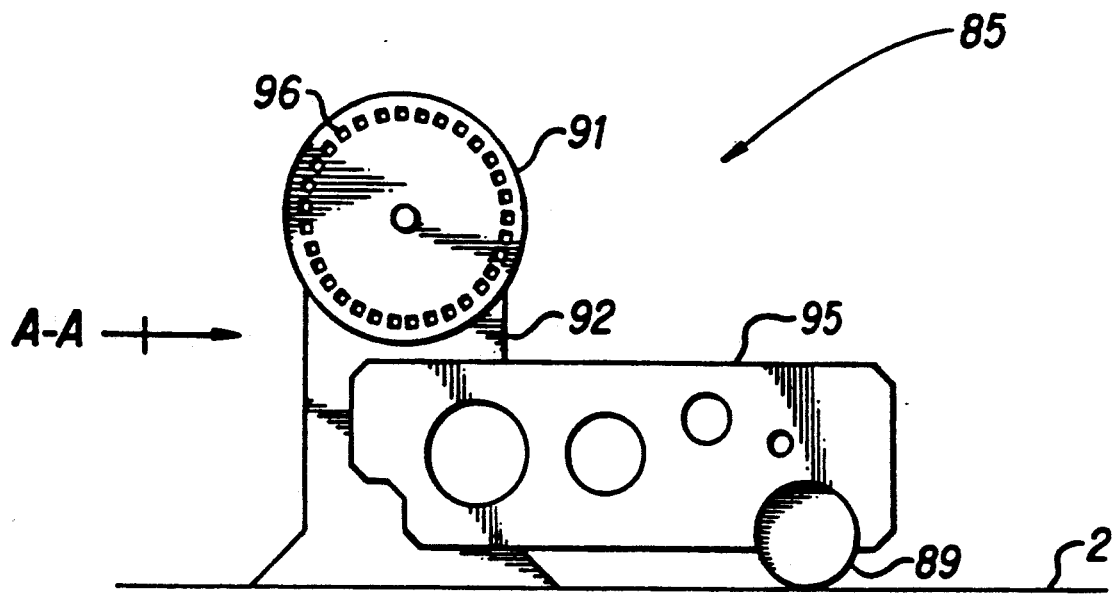
FIG. 9a shows a general view of the movement sensor of the embodiment of FIG. 8.
Figure 9B:
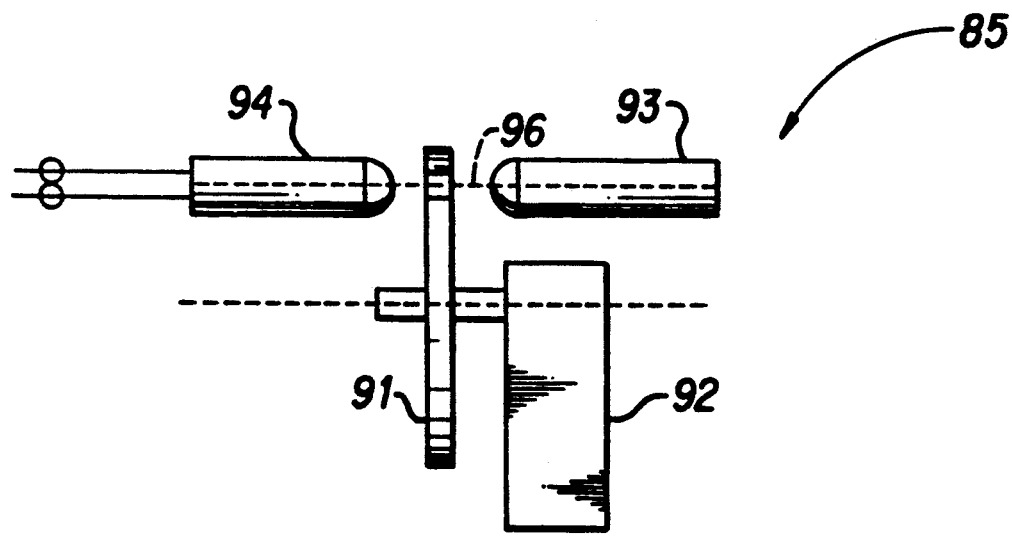
Figure 10:
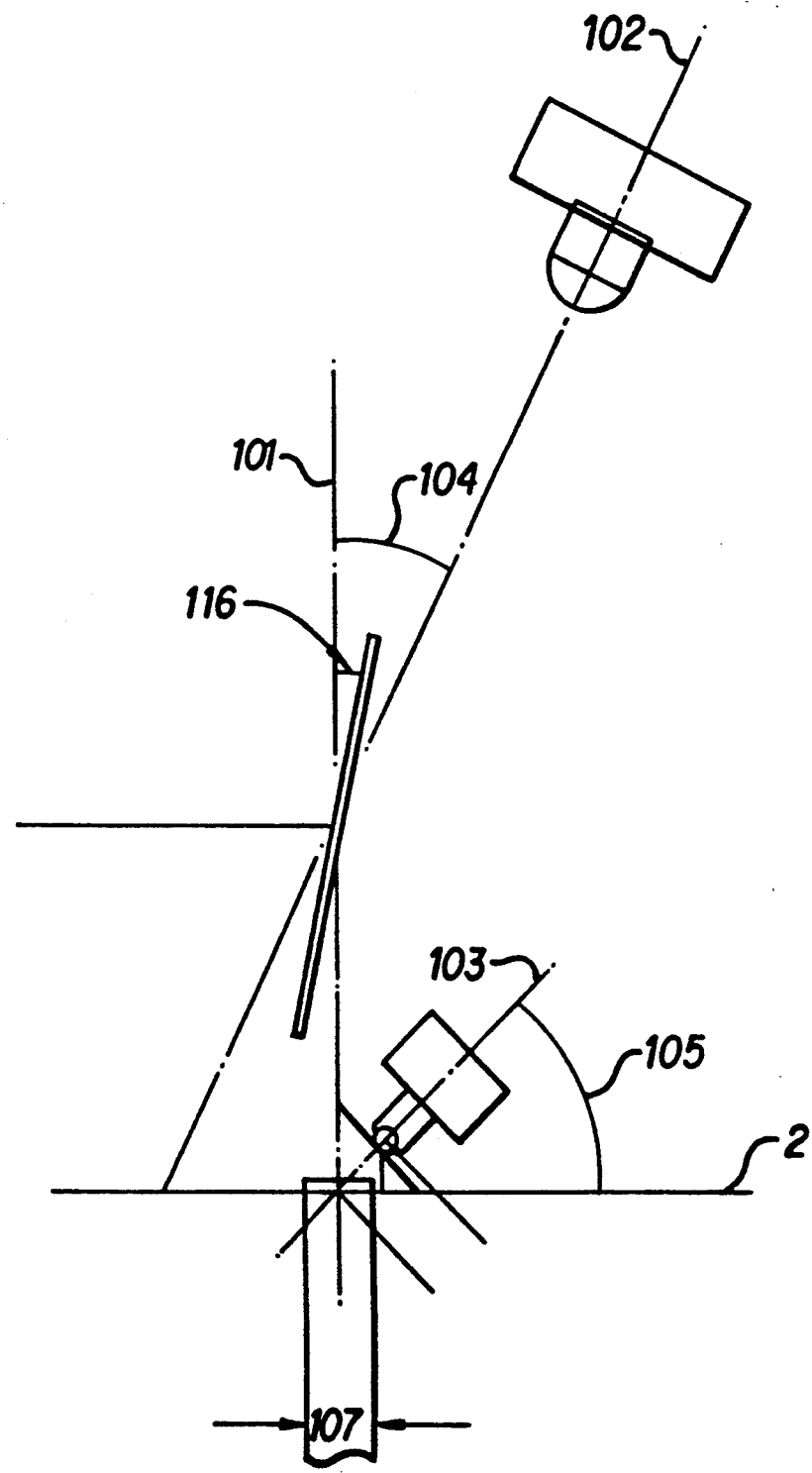
FIG. 10 provides detail of the geometry of the optical system of the embodiment of FIG. 8.

The illumination system of an alternative embodiment is shown in FIG. 8. A source of illumination 81 generates a focussed light beam 87 which is reflected off a mirror 86 to illuminate the field of view 88. An optical system 82 projects an image 83 of the field of view onto an image sensor 84. In this embodiment a movement sensor system 85, having a wheel 89, is mounted external to the housing. Details of the movement sensor system are shown in FIG. 9a and FIG. 9b. In this system an optical coding disk 91 mounted on support structure 92 is illuminated by an LED light source 93. Light detector 94 detects light beam 96 and thereby detects rotation of the disk which is driven via a gear train in transmission box 95. Details of the geometry of the optical system for this embodiment are given in FIG. 10. The axis 102 of the illumination system is angled to the area of view. It is at an angle 104 of 30° to the axis 101 perpendicular to the area of view. The mirror is at angle 116 of 15 to the perpendicular to the area of view. The axis of the detection system 103 is a)so angled to the area of view. The angle 105 is 45°. The long axis or length of the area of view 107 is 5.40 mm–5.70 mm.

CHARACTER CAPACITY OF SCANNER MEMORY

Bit-mapped image codes representative of a given character are transformed into ASCII or other codes in a computer. It can be seen that as processors and memory become smaller and cheaper this function may be performed within the housing of the self-contained hand-held scanner of FIG. 4b. In such an embodiment individual characters may be stored temporarily in bit-mapped form as described herein above and are then transformed into and accumulated in ASCII form. Since many more characters may be stored in a given block of memory in ASCII form than may be stored in bit-mapped form, the character capacity of the scanner is increased significantly.

PHOTO DIODE MOUNTING

Commercially available diode arrays having integral amplification are too large to fit within the confines of a housing that is not substantially greater than 1 inch (2.54 cm) across so that it may be pen-like. Accordingly, the diode array and the amplifier are mounted in separate packages. The center to center spacing between adjacent photo diodes is chosen to be between 0.0800 mm and 0.0868 mm for similar reasons.

FULL FIELD OF VIEW

The first embodiment of the scanner of the present invention allows the user to view an unobstructed string of characters including the character being scanned. See FIG. 3a. This facilitates the natural hand-eye coordination by the user. It allows the user to execute a "highlighting" motion while having an unobstructed view of at least a portion of the line of characters, including the character in the area of view of the scanner.

Figure 11:
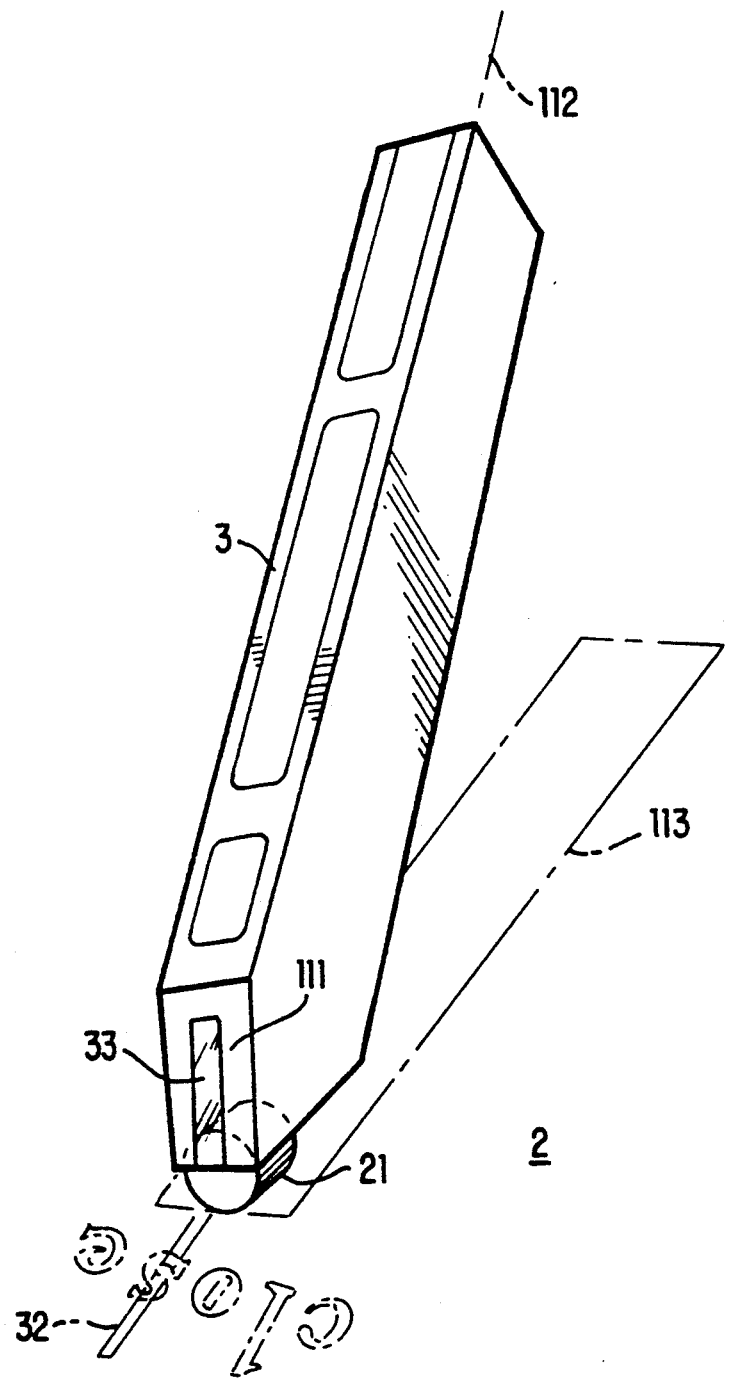
FIG. 11 is a partially cut-away perspective view of a fourth embodiment of the present invention.
Figure 12:
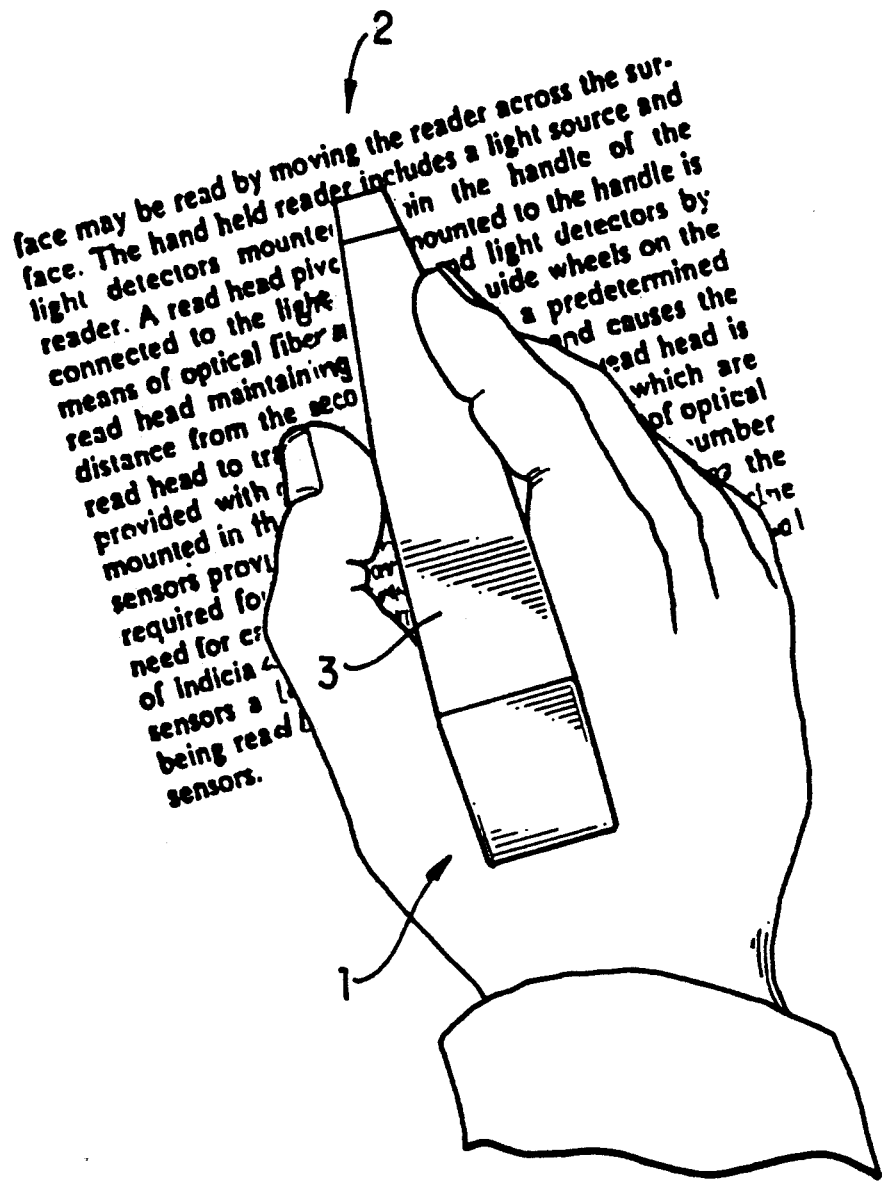
FIG. 12 is a general view of the embodiment of FIG. 11.

A fourth embodiment of the scanner of the present invention provides full-field view. This embodiment allows the user to view, unobstructed, the entire string of characters, including the character being scanned. It allows the user to execute an "underlining" motion. This embodiment is shown in FIG. 11. It includes an elongated housing 3, the housing having a brow 111 which is at an angle to the longitudinal axis 112 of the housing. The housing includes within the brow an elongated window 33 which defines an area of view 32. It can be seen that the area of view is clear of the housing and that the projection 113 of the housing onto the substrate 2 does not cover the area of view. This means that the user, looking down onto the substrate, can see both the area of view and the entire string of characters on either side of the character being scanned. FIG. 12 shows the user "underlining" the words "reader includes" so as to scan the one character (in this case the space character between "reader" and "includes"). While the space character is being scanned, the user can see the entire line of characters, i.e., the second line of text in FIG. 12. FIGS. 13 and 14 provide additional detail of fourth embodiment. FIG. 14 shows the brow 111 may have two angled portions. Alternatively, the brow may be curved.

The scanner of the present invention, in both the embodiments of FIGS. 1–10 and the embodiments of FIGS. 11–14, provides the user with an unobstructed view of the string of characters adjacent to the character being scanned. In the embodiment shown in FIG. 3a, the unobstructed view of the line of characters extends from the character being scanned to one end of the line. In the embodiment of FIG. 11, the unobstructed view of the line of characters extends from the character being scanned to both ends of the line. The embodiment of FIG. 11 provides full-field of view and allows the user to perform an "underlining" motion, i.e., underlining a line of characters that is in full view. This minimizes inaccuracies attributable to human hand-eye coordination and therefore support greater accuracy in aiming.

The scanner of the present invention, in all its embodiments, exposes at least a significant portion or all of the string of characters to the user's direct vision. The embodiment of FIG. 11 improves upon this original concept by allowing the user to position the device below the character stream. The required "underlining" (or "subscripting") motion eliminates any need for optical display. It requires of the user only the relatively simple maneuver generally associated with underlining with a pen or pencil. This is significantly easier to perform and provides higher accuracy than the simultaneous aiming of the scanner while monitoring covered images required by scanners in the prior art.

What is claimed is:

1. A hand-held scanner for reading characters from a strong of characters recorded on a substrate, comprising:

a housing, being adapted to be held by a user in the manner of a pen and being further adapted such that the scanner may be conveniently moved, in contact with the substrate, along the string of characters, the housing having a bottom face adjacent the substrate, the bottom face having a projection on the substrate;

movement sensor means, mounted to the housing, for detecting movement of the scanner across the surface of the substrate;

optical means, located within the housing, for viewing an area of view;

optical detector means, located within the housing, for detecting the relative intensity of light reflected from each of a plurality of points in the area of view;

wherein the housing is further adapted such that the area of view is outside of the projection of the housing's bottom face on the substrate, so that the user may view a field of view which includes the area of view, and such that the field of view is entirely unobstructed by the housing in at least one direction along the string of characters from the area of view, so as to facilitate tracing.

2. An apparatus according to claim 1, wherein the field of view is entirely unobstructed by the housing in both directions along the string of characters from the area of view.

3. A hand-held scanner for reading characters from a string of characters recorded on a substrate, comprising:

a housing, being adapted to be held in the manner of a pen and being further adapted such that the scanner may be conveniently moved, in contact with the substrate, along the string of characters;

movement sensor means, mounted to the housing, for detecting movement of the scanner across the surface of the substrate;

optical means, located within the housing, for viewing an area of view;

optical detector means, located within the housing, for detecting the relative intensity of light reflected from each of a plurality of points in the area of view;

wherein the housing has an elongated shape and a longitudinal axis, and a brow proximate to the substrate and angled with respect to the longitudinal axis, the brow having a window for defining the area of view, such that the area of view may lie substantially outside the projection of the housing on the substrate.

4. An apparatus according to claim 3, wherein the area of view does not extend substantially above the tallest character in the character string nor substantially below the deepest character in the character string.

5. An apparatus according to claim 4, wherein the length of the area of view, in a direction transverse to the string of characters, is between 5.40 mm and 5.70 mm long.

6. An apparatus according to claim 3, wherein the scanner further includes memory means for storing codes representing individual characters.

7. An apparatus according to claim 6, further comprising a battery-operated power supply and wherein the scanner is self-contained.

8. An apparatus according to claim 7, further including interface means, including a connector, for transferring the codes from the memory means to a computer.

9. An apparatus according to claim 7, wherein the memory means is removable.

10. An apparatus according to claim 3, further including a computer, in communication with the housing.

11. An apparatus according to claim 10, wherein the computer further includes a direct memory access channel, and the computer accepts the synchronization signals via the direct memory access channel.

12. An apparatus according to claim 11, the computer further including display means for display of scanned characters.

13. An apparatus according to claim 3, wherein the movement sensor means includes a wheel whose axis is transverse to the string of characters while the scanner is being used for scanning.

14. An apparatus according to claim 3, wherein the optical detector means further includes:

photo diode array means for transforming light into an electrical signal; and amplification means for accepting and amplifying the electrical signal;

wherein the photo-diode array means and the amplification means are mounted in separate packages.

15. An apparatus according to claim 14, wherein the photo diode array means further includes a linear array of photo diodes and the center to center spacing between adjacent photo diodes is between 0.0800 mm and 0.0868 mm.

16. A hand-held scanner for reading characters from a string of characters recorded on a substrate, comprising:

a housing, being adapted to be hand-held and being further adapted such that the scanner may be conveniently moved, in contact with the substrate, along the string of characters;

movement sensor means, mounted to the housing, for detecting movement of the scanner across the surface of the substrate and providing synchronization signals indicative of a series of positions along the length of the string of characters;

optical means, located within the housing, for viewing an elongated area of view transverse to the string of characters;

optical detector means, located within the housing, for detecting the relative intensity of light reflected from each of a plurality of points along the elongated area of view and providing an intensity signal for each point; and electronic means, mounted within the housing, for accepting intensity signals and synchronization signals and identifying the intensity signals associated with a given character in the string of characters;

wherein the housing has an elongated shape and a longitudinal axis, and a brow proximate to the substrate and angled with respect to the longitudinal axis, the brow having a window for defining the area of view, such that the area of view may lie substantially outside the projection of the housing on the substrate.

17. An apparatus according to claim 16, further including means for translating intensity signals into binary data and means for assembling the binary data associated with a given single character into a set of binary data representative of that single character.

18. An apparatus according to claim 17, further including display means, mounted to the housing, for display of scanned characters.

19. A hand-held scanner for reading characters from a string of characters recorded on a substrate, comprising:
- a housing, being adapted to be held by a user in the manner of a pen and being further adapted such that the scanner may be conveniently moved, in contact with the substrate, along the string of characters;
- movement sensor means, mounted to the housing, for detecting movement of the scanner across the surface of the substrate;
- optical means, located within the housing, for viewing an area of view;
- optical detector means, located within the housing, for detecting the relative intensity of light reflected from each of a plurality of points in the area of view;
- wherein the housing is further adapted such that the user may view a field of view which includes the area of view, along a line of sight, between an eye of the user and the area of view, that is approximately perpendicular to the substrate, and such that the field of view is entirely unobstructed by the housing in at least one direction along the string of characters from the area of view, so as to facilitate tracking.

20. An apparatus according to claim 19, wherein the field of view is entirely unobstructed by the housing in both directions along the string of characters from the area of view.

* * * * *

UNITED STATES PATENT AND TRADEMARK OFFICE
CERTIFICATE OF CORRECTION

PATENT NO. : 5,301,243
DATED : April 5, 1994
INVENTOR(S) : Olschafskie and Chasanoff It is certified that error appears in the above-indentified patent and that said Letters Patent is hereby corrected as shown below:

Column 9, line 5, "strong" should be --string--.
line 30, "tracing" should be --tracking--.

Signed and Sealed this

Sixth Day of September, 1994

Attest:

BRUCE LEHMAN

Attesting Officer

Commissioner of Patents and Trademarks